United States Patent
Evans et al.

(10) Patent No.: US 7,191,180 B2
(45) Date of Patent: Mar. 13, 2007

(54) DATA ACCESS

(75) Inventors: Paul A Evans, Ipswich (GB); Richard J Cobley, Colchester (GB)

(73) Assignee: Bristish Telecommunications public limited company, London (GB)

(*) Notice: Subject to any disclaimer, the term of this patent is extended or adjusted under 35 U.S.C. 154(b) by 292 days.

(21) Appl. No.: 10/204,857

(22) PCT Filed: Mar. 5, 2001

(86) PCT No.: PCT/GB01/00934

§ 371 (c)(1),
(2), (4) Date: Aug. 26, 2002

(87) PCT Pub. No.: WO01/71556

PCT Pub. Date: Sep. 27, 2001

(65) Prior Publication Data

US 2003/0033283 A1    Feb. 13, 2003

(30) Foreign Application Priority Data

Mar. 22, 2000  (GB) .................. 0006972.4
Jun. 8, 2000  (EP) .................. 00304860

(51) Int. Cl.
*G06F 17/30* (2006.01)
(52) U.S. Cl. .......................... 707/10; 707/1; 707/104.1
(58) Field of Classification Search ............... 707/1, 707/2, 3, 4, 5, 6, 7, 8, 9, 10, 101, 102, 200, 707/201, 104.1; 709/214, 200, 226; 711/118
See application file for complete search history.

(56) References Cited

U.S. PATENT DOCUMENTS 6,167,438 A * 12/2000 Yates et al. .................. 711/118
6,185,598 B1 * 2/2001 Farber et al. ................ 709/200
6,317,778 B1 * 11/2001 Dias et al. ................... 709/214
6,330,605 B1 * 12/2001 Christensen et al. ........ 709/226
6,829,770 B1 * 12/2004 Hinson et al. ............... 719/318

FOREIGN PATENT DOCUMENTS

WO    WO 99/24923    5/1999
WO    WO 99/48003    9/1999

OTHER PUBLICATIONS

Dingle et al. "Web Cache Coherence", Computer Networks and ISDN Systems, NL, North Holland Publishing. Amsterdam, vol. 28, No. 11, May 1, 1996, pp. 907-920, XP004018195.

* cited by examiner

*Primary Examiner*—Yicun Wu
(74) *Attorney, Agent, or Firm*—Nixon & Vanderhye P.C.

(57) ABSTRACT

A data access system includes proxy servers for caching "local" copies of selected data sets stored on data servers to which users request access. Each proxy server is adapted to generate a subscription request message in respect of each identified cached data set for submission to a conventional "publish & subscribe" data distribution system. The data distribution system is arranged with access to "published" updates to data sets, made available from respective data servers. Upon receipt of a published updated data set having an identifier matching that in an earlier-received subscription request, the data distribution system forwards the data set to the subscribing proxy server to enable update to the respective cached copy. Thus, a proxy server, having decided to cache a particular data set, need only issue a subscription request message in order to receive all subsequent updates, as they become available, until choosing to remove the data set from the cache.

18 Claims, 2 Drawing Sheets

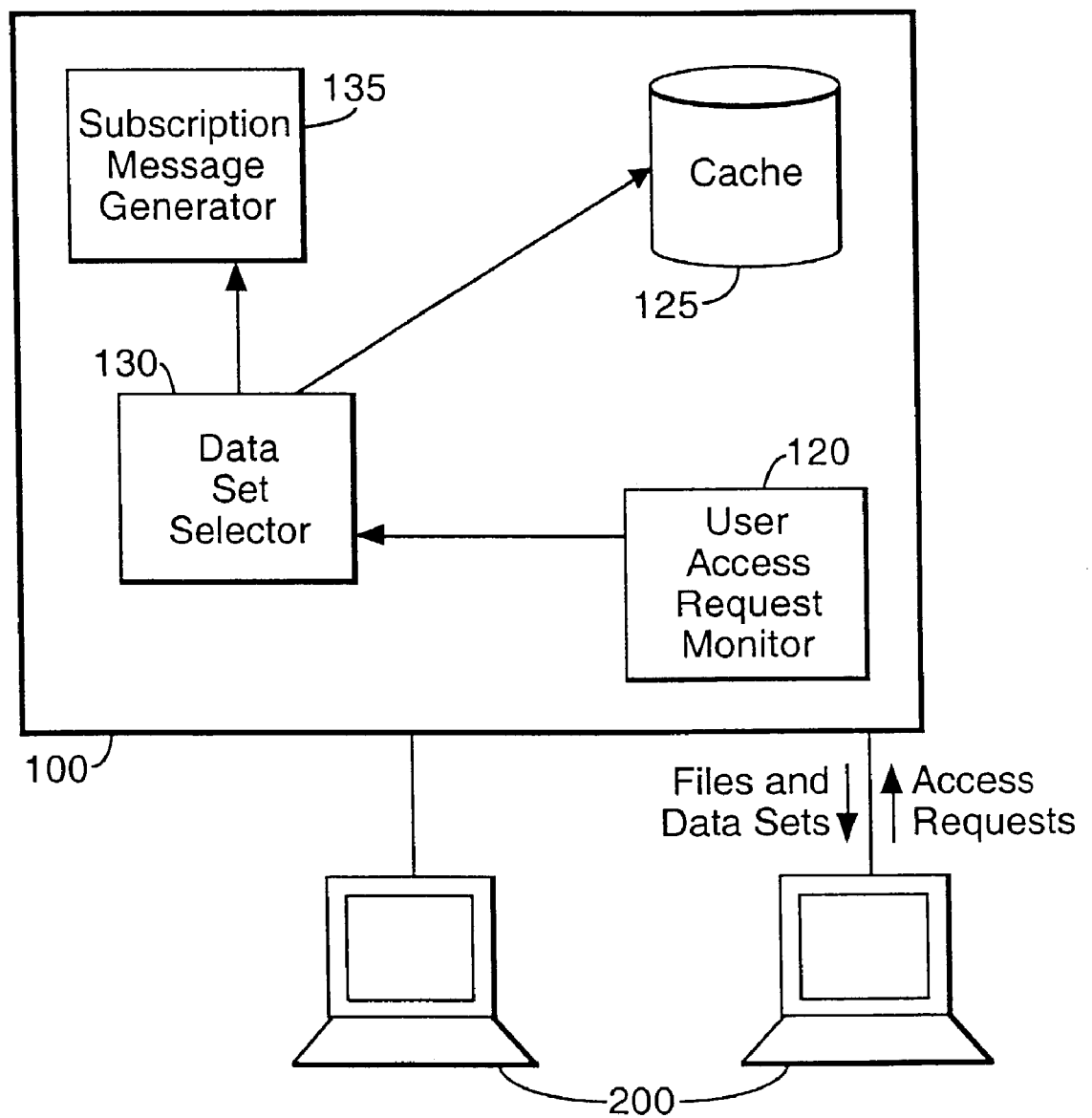

DATA ACCESS

This application is the US national phase of international application PCT/GBO1/00934 filed 5 Mar. 2001 which designated the U.S.

BACKGROUND OF THE INVENTION

1. Field of the Invention

This invention relates to data access and in particular to maintaining integrity of cached copies of data.

2. Related Art

The use of proxy servers to cache frequently accessed data sets is well known. Proxy servers may be provided to service a "local" community of users, storing (caching) local copies of frequently requested data sets that would otherwise need to be retrieved from their respective originating data sources every time a user requested access to them. Once a proxy server has stored a local copy of a particular data set, a subsequent request for access by a user to that data set is intercepted by the proxy server and access provided rapidly to the locally cached copy rather than to the originating source specified in the request.

A proxy server may include features to monitor user access requests and to select data sets for caching according to a predetermined selection algorithm. For example, a data set may be selected for caching if access to it was requested from three or more different users over a predetermined time period. A cached data set may be deleted from the cache if the time period between consecutive access requests exceeds a predetermined threshold.

A proxy server must ensure that any cached data sets remain up-to-date with respect to changes to the "original" data set held at the originating data source. To achieve this, known proxy servers use one or more of the following techniques:

(1) Periodic checking— once a data set has been cached, the proxy server submits periodic requests for access to the original source of the data set to determine whether amendments have been made. However, if the proxy server is to keep up to date with many cached data sets, a great deal of proxy server processing time and communications bandwidth is consumed if the period between requests is to be kept sufficiently short in order to avoid serving out-of-date data sets to users.

(2) Patterns associated with data being updated— the proxy server looks for patterns in the update of a data set and attempt to predict when it will next be amended. For example, if a data set has consistently been updated each morning at 6 am (e.g. a newspaper), then the proxy server may download a new copy of the data set from the corresponding source at say 6.01 every morning. However, it is not possible to be 100% accurate in predicting when a data set will be updated.

(3) Specified expiry time— a data set provider tags the data set with a 'will be valid until . . . ' message. The proxy server will not seek to refresh the cached copy until after that time. However, timely refresh of the cached copy depends upon the clocks between the proxy and data source being reasonably well aligned and upon the data set not expiring early. In practice short expiry periods are used, e.g. 1 hour.

(4) Update queries triggered by user access requests—every time a proxy server receives a request for access to a cached data set, the proxy server sends a message to the corresponding source of that data set asking "Has this data set been updated since xxxx", where xxxx is a time or date. If it has, then a copy of the new data set is downloaded to the cache. While this is one of the most common modes of operation of proxy servers, it may add considerable time delay to the servicing of a request for access, and consumption of communications bandwidth in submitting an update query every time. This dramatically decreases the Quality of Service available to broadband users who expect far more rapid access to requested data sets.

BRIEF SUMMARY

Aspects of the present invention are as set out in the claims, individually or in combinations thereof.

Embodiments of the present invention can be used to provide, to a group of user interfaces, access to files which are cached locally but which are each automatically updated as soon as an update becomes available at a source file server. This is facilitated by using a publish and subscribe system to update the cached files. The publish and subscribe system in turn can be fed updates to the individual files by a source file server which is adapted to detect file updates and then use "push technology" to send the updates to the publish and subscribe system.

In at least a first aspect of the present invention, it is not necessary for a proxy (or caching) server to actively validate then update cached data sets once a decision has been made to cache a particular data set. Instead, the proxy server generates a subscription request message for sending to a predetermined node of a known "publish & subscribe" data distribution system, requesting receipt of any new "published" version of the particular identified data set. The data distribution system is arranged with access to published updates to data sets from corresponding data sources. If the data distribution system receives a data set having the same identifier as one subscribed to, the data set will be propagated through the data distribution system and delivered to the subscribing proxy server. On receipt, the proxy server overwrites the existing cached copy of the data set with the newly delivered version.

If a proxy server deletes a data set from its cache, the proxy server is arranged to generate an "unsubscribe" message for sending to the data distribution system to ensure that further updates to the data set are no longer delivered.

Preferably, data sources may be arranged to "publish" to the data distribution system a copy of each data set that is changed at that source. If the data distribution system has received a subscription request from a proxy server in respect of a changed data set received from a source, then the data distribution system delivers the changed data set to the subscribing proxy server. Preferably, a change monitoring process may be implemented at data sources to monitor changes to files and to "push" a copy of each changed file to a predetermined point of entry to the data distribution system. Any changed file that is not the subject of a subscription by a proxy server will not be propagated further by the data distribution system.

A "data set" or a "file", in the context of the present invention, might in practice be any of several different types of electronically transmittable entities such as those accessible over the Internet, including for instance text, graphics, spreadsheets, computer programmes, audio, video, multimedia, or data. It should also be noted that a "user" may in practice be non-human, such as a machine or a piece of software.

BRIEF DESCRIPTION OF THE DRAWINGS

There now follows, by way of example only, a description of a specific embodiment of the present invention. This description is to be read in conjunction with the accompanying drawing, in which:

FIG. 2 shows a block diagram of a caching server for use in the data access system of FIG. 1.

DETAILED DESCRIPTION OF EXEMPLARY EMBODIMENTS

Figure 1:
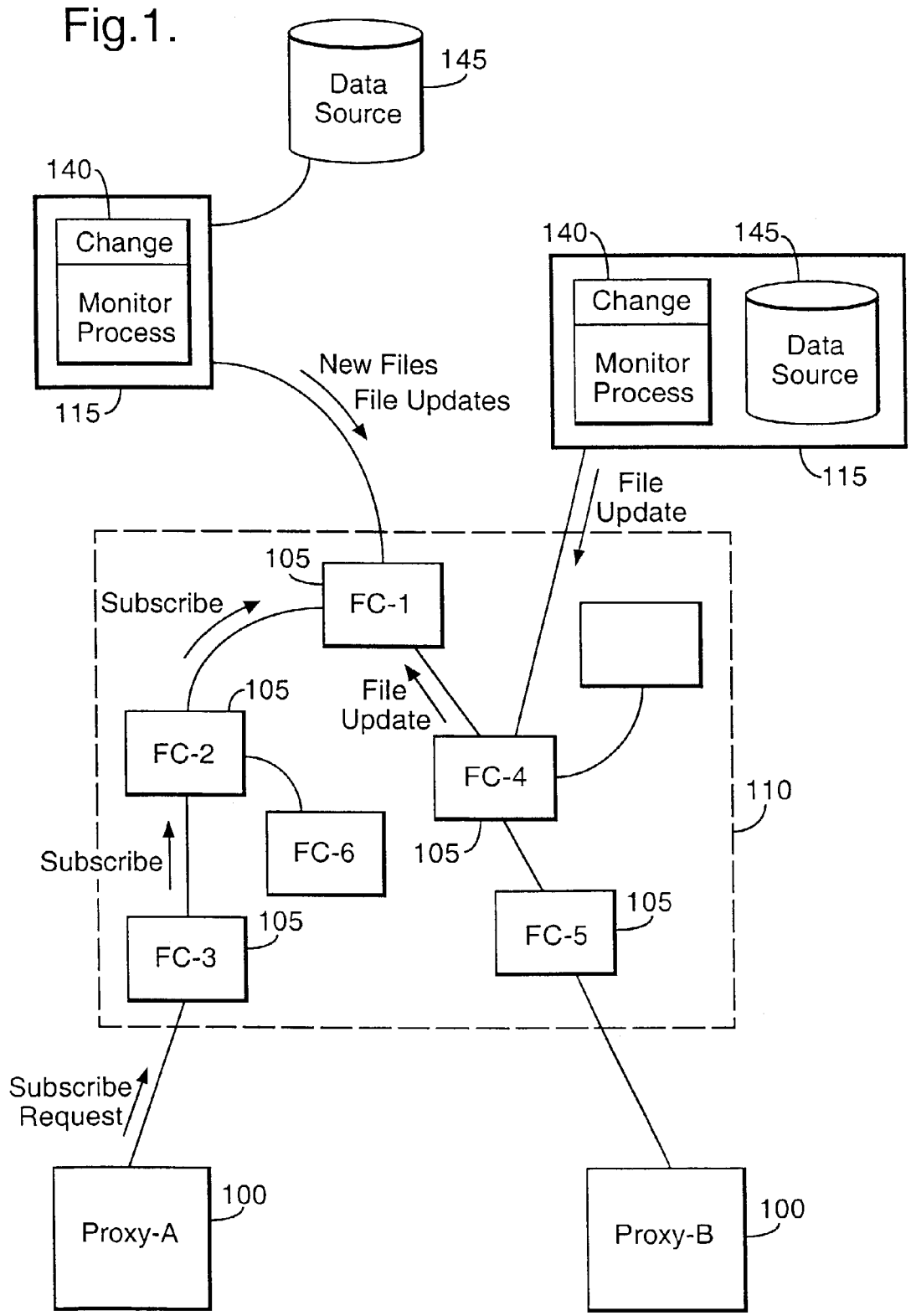
FIG. 1 shows a block diagram of a data access system according to a preferred embodiment of the present invention.

Referring to FIG. 1, a diagram is provided showing in schematic form a data access system according to a preferred embodiment of the present invention. Two proxy servers 100 are shown arranged with access to forwarding computers 105 of a "publish & subscribe" data distribution system 110 comprising, in this example, a simple hierarchy of forwarding computers 105 (FC-1 to FC-6). Servers 115 representing sources of data sets are also shown arranged with access to forwarding computers 105 of the data distribution system 110.

Referring to FIG. 2, a proxy (or caching) server 100 includes: a user access request monitor 120 for intercepting and monitoring messages sent by client devices 200 containing requests for access to data sets stored on data servers 115; a cache (store) 125; and a data set selector 130 for selecting data sets for storage in the cache 125 according to a predetermined selection algorithm. A proxy server 100 also includes a subscription message generator 135 for generating and sending messages to the data distribution system 110 to subscribe on behalf of the proxy server to receive updates to specified data sets.

The subscription message generator 135 is arranged to generate subscription messages in a format acceptable to the data distribution system 110. A subscription message includes an address for the subscribing proxy server 100, an indication of whether the message is a "subscribe" or "unsubscribe" request message and a unique identifier for the data set for which updates are/were sought. Preferably, the data set selector 130 may be adapted to signal to the subscription message generator 135 the unique data set identifier of a data set for which a decision has been made to store a copy in the cache 125 and an indication that a "subscription" request message is to be generated. Similarly, upon deciding to remove a data set from the cache 125, the data set selector 130 may signal to the subscription message generator 135 to generate an "unsubscribe" message in respect of that data set.

In operation, proxy server 100, by means of the user access request monitor 120, intercepts a user's message requesting access to a data set stored on a specified data server 115. If the requested data set is stored in the cache 125, then the proxy server 100 services the access request by providing access to the cached copy of the requested data set, trapping the user's access request message. If the requested data set is not stored in the cache 125, then the user's access request message is forwarded to the specified data server 115 over a conventional communications network (not shown in FIG. 1). The user's access request is also copied to the data set selector 130 to determine whether or not a copy of the requested data set should be stored in the cache 125. Such a storage decision may be made for example for the benefit of providing faster subsequent user access to that data set. A conventional selection algorithm may be implemented by the data set selector 130, for example implementing selection criteria listed above in the introductory part of the present patent application.

If the data set selector 130 chooses to store the requested data set in the cache 125, proxy server 100 may be arranged to intercept a response from the specified data server 115 to the corresponding user's access request message and to copy the data set supplied in the response to the cache 125, thereafter forwarding the response to the client device for the requesting user. On selecting the data set for storage in the cache 125, the data set selector 130 is arranged to trigger the subscription message generator 135 to generate a subscription request message, supplying to the subscription message generator 135 a unique identifier for the selected data set for inclusion in the subscription request message, and to send the generated message to the "publish & subscribe" data distribution system 110, preferably to a predetermined forwarding computer 105 of that system.

On receipt of a subscription request message, the data distribution system 110 registers the request in a conventional way to ensure that a subsequently received data set having the identifier specified in the subscription request will be forwarded and delivered by forwarding computers 105 of the system to one or more subscribing proxy servers 100.

In order for updates to data sets stored on data servers 115 to be made available to the data distribution system 110 for delivery to subscribing proxy servers 100, a simple update monitoring module 140 may be installed on each data server 115 to detect changes to data sets stored in a store 145 and to "publish" each changed data set by forwarding a copy of the data set to a predetermined forwarding computer 105 in the data distribution system 110. An update monitoring module 140 may be implemented in the form of a computer program for installation on a conventional data server. An example of a listing for such a computer program is attached to the present patent application as Annex A. A computer program such as that in Annex A would be suitable for installation and integration into a conventional data server for monitoring directories of files in the data server store 145 and for sending a copy of each file in which a change is detected to a predetermined destination.

On receipt of an updated copy of a cached data set, proxy server 100 is arranged to store the updated copy in the cache 125, overwriting the previously stored copy.

Of course, updates to data sets stored on data servers 115 may be made available by third party sources and "published" to the data distribution system 110 for delivery to subscribing proxy servers 100.

The preferred embodiment of the present invention as described above may be implemented to operate in the context of the Internet and World-wide Web. A conventional web proxy server, such as the 'Squid' server (or 'Cuttlefish' derivative), may be adapted to receive and install a subscription message generation module 135 and to enable updates to cached data sets to be written to the cache 125 upon receipt. A skilled person would be readily able to implement proxy server features of the present invention on a conventional proxy server.

The present invention may also be applied to Wireless Application Protocol (WAP) proxy servers. WAP proxy servers operate in a similar way to web servers employing the Hypertext Transfer Protocol (HTTP) to access data sets.

ANNEX A

```
From win32 declarations module
'Windows 32API function call definitions & Constant Declarations
Option Explicit
'Constant Declarations
Public Const INFINITE = &HFFFF
Public Const WAIT_OBJECT = &H0
Public Const WAIT_ABANDONED = &H80
Public Const WAIT_TIMEOUT = &H102
'File Change Notification Flag in this instance set just to monitor changes
to last file write
'time
Public Const FILE_NOTIFY_CHANGE_LAST_
WRITE As Long = &H10
'API Interface Declarations
Public Declare Function FindFirstChangeNotification Lib "kernel32" _
    Alias "FindFirstChangeNotificationA" _
    (ByVal lpPathName As String, _
    ByVal bWatchSubtree As Long, _
    ByVal dwNotifyFilter As Long) As Long
Public Declare Function FindCloseChangeNotification Lib "kernel32" _
    (ByVal hChangeHandle As Long) As Long
Public Declare Function FindNextChangeNotification Lib "kernel32" _
    (ByVal hChangeHandle As Long) As Long
Public Declare Function WaitForMultipleObjects Lib "kernel32" _
    (ByVal nCount As Long, _
    lpHandles As Long, _
    ByVal bWaitAll As Long, _
    ByVal dwMilliseconds As Long) As Long
From main module
'Set option explicit so all variables used must be pre-declared
Option Explicit
'Declare Global Variables
Dim hChangeHandle As Long
Dim hWatched( ) As Long
Dim TerminateFlag As Long
Private Sub Form_Load( )
    Dim fso, FilesCollection, RootFolder, File, newdate, changedfile
    Dim cIniReturn, TerminateFlag As Boolean
    Dim i As Integer
    Dim WatchStatus As Long
    Dim WatchPath As String
    Dim cIniData As String
    Dim FolderArray( ) As String
    'CDS_CIni is a class module for parsing mi files
    Dim cIni As New CDS_CIni
    WatchPath = "C:\InetPub\wwwroot\" 'Root path of watched
    directory tree
    TerminateFlag = False
    'Find all directories under the WatchPath and write to folder array
    FolderArray = FindDirectories(WatchPath)
    'Add root watch path to end of watched directory array
    ReDim Preserve FolderArray(UBound(FolderArraY) + 1)
    FolderArray(UBound(FolderArray)) = WatchPath
    ReDim hWatched(UBound(FolderArray))
    'Create a watched directory tree & show list of watched folders
    Set fso = CreateObject("Scripting.FileSystemObject")
    'Set reference ini file name
    cIni.FileName = App.Path & "\data.ini"
    For i = 0 To UBound(FolderArray)
hWatched(i) =WatchCreate(FolderArray(i) ,FILE_NOTIFY_
CHANGE_LAST_WRITE)
        Set RootFolder = fso.GetFolder(FolderArray(i))
        Set FilesCollection = RootFolder.Files
    'write last modified time & file path to ini file under file path key for
    each file
    'syntax is cIniWriteValue( ini file key name, field name, value)
    'where key name is the ini file key for rapid relocation of record in file
    'field is the field name for that key and value is the value to write to
    the file
        For Each File In FilesCollection
            cIni.WriteValue FolderArray(i) & "\" & File.Name,
"Lastwrite", File.DateLastModified
            cIni.WriteValue FolderArray(i) & "\" & File.Name, "FilePath",
FolderArray(i) & "\" &
            _File.Name
        Next
    Next
'Setup wait state ready for change
```

ANNEX A-continued

```
    WatchStatus = WatchDirectory(UBound(hWatched) + 1, hWatched,
100)
    '(perform actions) for first detected change
    Set RootFolder = fso.GetFolder(FolderArray(WatchStatus))
    Set FilesCollection = RootFolder.Files
    For Each File In FilesCollection
        'check current file last modified date against stored date to find
        changed file
        cIniReturn = cIni.ReadValue(FolderArray(WatchStatus) & "\" &
File.Name, _
            "Lastwrite", cIniData)
        If cIniData <> File.DateLastModified Then
            newdate = cIniData
            'Modified File has been found store path & open socket
            cIniReturn = cIni.ReadValue(FolderArray(WatchStatus) & "\" &
File .Name, _
                "FilePath", cIniData)
            changedfile = cIniData
            sckConnect.Connect
            'code will then jump to connect event and send data of changed
            file to beacon
            sckConnect Close
        End If
    Next
    'now go into a second loop, this time calling the
    FindNextChangeNotification API,
    'exiting if watchStatus indicates the terminate flag was set -
    for this demo code
    'this is an infinite loop for processing changes but final code will
    have an event to
    'set terminate flag when a request to cease monitoring is received
    Do While TerminateFlag = False
        'write new modified date of changed file to ini file
            cIni.WriteValue changedfile, "Lastwrite", newdate
        'reset handle with previously signalled change & resume watch wait
        state
        WatchStatus = WatchResume(WatchStatus, hWatched, 100)
        '(perform actions) for detected change
        Set RootFolder = fso.GetFolder(FolderArray(WatchStatus))
        Set FilesCollection = RootFolder.Files
        For Each File In FilesCollection
        'check current file last modified date against stored date to find
        changed file
            cIniReturn = cIni.ReadValue(FolderArray(WatchStatus) & "\" &
File .Name, _
                "Lastwrite", cIniData)
            If cIniData <> File.DateLastModified Then
                newdate = cIniData
                'Modified File has been found store path & open socket
                cIniReturn = cIni.ReadValue(FolderArray(WatchStatus) & "\" &
File.Name, _
                    "FilePath", cIniData)
                changedfile = cIniData
                'sckConnect is a winsock control object
                sckConnect.Connect
                'code will then jump to connect event and send data of changed
                file to beacon
                sckConnect.Close
            End If
        Loop
End Sub
Private Function WatchCreate(lpPathName As String, flags As Long)
As Long
    'Calls FindFirstChangeNotification to return a change monitoring
    handle
    'on the specified directory path specified for the change event
    set by the
    'FILE NOTIFY FLAG
    Dim WatchSubTree As Long
    WatchSubTree = 0
    'FindFirstChangeNotification members:
    '
    ' lpPathName: folder to watch
    ' WatchSubTree:
    '   True (1) = watch specified folder and its sub folders
    '   False (0) = watch the specified folder only
    ' flags: FILE_NOTIFY_flag to apply
    WatchCreate = FindFirstChangeNotification(lpPathName,
    WatchSubTree,
```

ANNEX A-continued

```
flags)
End Function
Private Function WatchDirectory(ArrayLen As Long, HandleArray( )
As Long, interval As Long) As Long
    'Sets up wait state on handle array using WaitForMultipleObjects
(returns array index of
    'handle signaling change)
    'ArrayLen - Length of Handle Array
    'HandleArray(0) actually passes pointer to entire HandleArray into
WaitForMultipleObjects
    'False - means wait state should not wait for all handles to signal
a change so it will return
    'on 1 change interval - wait state interval, would be set to infinite
in a multi threaded
    'implementation
    Dim r As Long
    r = WAIT_TIMEOUT
    Do While r = WAIT_TIMEOUT And TerminateFlag = False
        r = WaitForMultipleObjects(ArrayLen, HandleArray(0) , False,
interval)
        DoEvents
    Loop
    WatchDirectory = r
End Function
Private Function WatchResuxne(Index As Long, HandleArray( ) As Long,
interval) As Long
    'Resets triggered directory handle using FindNextChangeNotification
    'and then calls waitForMultipleObjectst to wait for next event trigger
    Call FindNextChangeNotification (HandleArray(Index))
    Dim r As Long
    r = WAIT_TIMEOUT
    Do While r = WAIT_TIMEOUT And TerminateFlag = False
        r = WaitForMultipleObjects(UBound(HandleArray) + 1,
HandleArray(0), False, interval)
        DoEvents
    Loop
    WatchResume = r
End Function
Function FindDirectories(fPath As String) As String( )
    'This procedure runs through all of the directories
    'in the watched path using a recursive call to build
    'an array of all the watched directories
    Dim fso, RootFolder, Folder, FolderCollection, i
    Dim FolderArray( ) As String
    Dim TempFolderArray( ) As String
    ReDim FolderArray(0)
    Set fso = CreateObject ("Scripting.FileSystemObject")
    Set RootFolder = fso.GetFolder(fPath)
    Set FolderCollection = RootFolder.SubFolders
    For Each Folder In FolderCollection
        FolderArray(UBound(FolderArray)) = Folder.Path
        ReDim Preserve FolderArray(UBound(FolderArray) + 1)
        TempFolderArray = FindDirectories(Folder.Path)
        If Not TempFolderArray(0) = "" Then
            For i = 0 To UBound(TempFolderArray)
                FolderArray(UBound(FolderArray)) = TempFolderArray(i)
                ReDim Preserve FolderArray(UBound(FolderArray) + 1)
            Next
        End If
    Next
    If UBound(FolderArray) > 0 Then
        ReDim Preserve FolderArray(UBound(FolderArray) - 1)
    End If
    FindDirectories = FolderArray
End Function
Private Sub sckConnect_Connect( )
    'Sends data down cache socket to update cache server
    sckConnect.SendData 'data to send to cache server goes here e.g. http
push of file
    'file path must be passed in
End Sub
```

What is claimed is:

1. A file server for retrieving and transmitting files in response to received requests, in a communications network including a data server and a data distribution system located between the data server and the file server, the file server comprising:

i) a request input for receiving file requests from client equipment;

ii) a request monitoring means for monitoring received file requests;

iii) a subscription request output for requesting future automatic file updates;

iv) file retrieval means for retrieving a file identified in a received file request from the data server and transmitting it to the client equipment making the request; and v) a cache for storing local copies of files for which file requests have been received;

wherein the request monitoring means is arranged to monitor received file requests, and, in the event of a predetermined condition being met for a file identified by at least one request, to trigger the subscription request output to output a subscription request with an associated identifier for the identified file to the data distribution system, wherein the subscription request causes the data distribution system to thereafter automatically forward to the file server updates for the identified file that have been pushed to the data distribution system from the data server when the identifier associated with the subscription request is determined by the data distribution system to correspond to an identifier associated with the file server updates for the identified file that have been pushed to the data distribution system.

2. A file server as in claim 1 wherein the predetermined condition comprises a threshold number of requests for the identified file.

3. A file server as in claim 1 wherein the predetermined condition comprises a threshold rate of requests for the identified file.

4. A method of providing updated files in response to file requests in a data access system, the data access system comprising a file server, a data server and a data distribution system, the data distribution system being arranged between the data server and the file server, the method comprising:

i) detecting updates to one or more files stored at the data server;

ii) pushing, when an update to a file has been detected, an updated file and an associated identifier from the data server to the data distribution system;

iii) receiving a request for a file from client equipment at the file server, and if a predetermined condition is met by the request, sending by the file server to the data distribution system a subscription request for future automatic updates to the file and an associated identifier;

iv) thereafter automatically sending the updated file from the data distribution system to the file server requesting the update if the data distribution system determines that the identifier associated the updated file corresponds to the identifier associated with the subscription request; and v) storing at the file server a copy of the file requested from the data distribution system.

5. A method as in claim 4 further comprising the step of deleting an existing stored copy of the file requested when a new version of the file requested is received at the file server, and storing the new version of the file at the file server.

6. A method as in claim 4, wherein the data distribution system does not forward any file updates that are not subscribed to by the file server.

7. A method as in claim 6, wherein the file server generates and sends an unsubscribed message to the data distribution system to stop the data distribution system from forwarding any file server updates to the file server.

8. A method as in claim 4, wherein if the file requested by the client equipment is not already stored in a cache of the file server, then the file server forwards a file request directly to the data server to forward the file requested from the data server to the client equipment before the file server outputs the subscription request.

9. A file server as in claim 1, wherein the cache is arranged to delete an existing stored copy of the identified file when a new version of the identified file is received at the file server, and storing the new version of the identified file in the cache.

10. A file server as in claim 1, wherein the data distribution system is arranged to not forward any file updates that are not subscribed to by the file server.

11. A file server as in claim 10, wherein the file server is arranged to generate and send an unsubscribe message to the data distribution system to stop the data distribution system from forwarding any file updates to the file server.

12. A data access system for providing updated files in response to file requests, the data access system comprising:
   a source file server arranged to store one or more files and to detect updates to the one or more files;
   a proxy server including a cache for storing a local copy of the one or more files; and
   a data distribution system located in operation between the source file server and the proxy server;
   wherein the source file server pushes an updated file including an identifier to the data distribution system upon detection of updates to the one or more files;
   the proxy server receives a request for a file from a client terminal, and if a predetermined condition is met by the request, sends to the data distribution system a subscription request for future automatic updates to the file, the subscription request including an identifier; and
   the data distribution system determines whether or not the identifier of the updated file and the identifier of the subscription request correspond to each other and automatically sends the updated file to the proxy server requesting updates to the file based on the determination.

13. A data access system as in claim 12 wherein the predetermined condition comprises a threshold number of requests for the identified file.

14. A data access system as in claim 12 wherein the predetermined condition comprises a threshold rate of requests for the identified file.

15. A data access system as in claim 12 wherein the proxy server sends an unsubscribe message to the data distribution system to stop the data distribution system from forwarding any file updates to the proxy server when that file is deleted from a cache of the proxy server.

16. A method of operating a data distribution system which is operatively arranged between a data server for storing one or more files and a proxy server for storing local copies of the one or more files, the method comprising:
   operatively arranging the data distribution system between the proxy server and the data server;
   receiving, from the proxy server, a request for a file a subscription request for future automatic updates to a file, the subscription request including an identifier;
   receiving an updated file, including an identifier, which has been pushed from the data server based upon the data server detecting an update to the file;
   determining whether the identifier of the subscription request and the identifier of the updated file correspond to each other;
   automatically sending the updated file received from the data server to the proxy server requesting the update based on the determination that the identifier of the subscription request and the identifier of the updated file correspond to each other.

17. A method as in claim 16 wherein the subscription request is provided by the proxy server to the data distribution system as a result of a predetermined condition being satisfied, the predetermined condition comprising a threshold number of requests for the identified file.

18. A method as in claim 16 wherein the subscription request is provided by the proxy server to the data distribution system as a result of a predetermined condition being satisfied, the predetermined condition comprising a threshold rate of requests for the identified file.

\* \* \* \* \*

UNITED STATES PATENT AND TRADEMARK OFFICE
CERTIFICATE OF CORRECTION

| | | |
|---|---|---|
| PATENT NO. | : 7,191,180 B2 | Page 1 of 1 |
| APPLICATION NO. | : 10/204857 | |
| DATED | : March 13, 2007 | |
| INVENTOR(S) | : Evans et al. | |

It is certified that error appears in the above-identified patent and that said Letters Patent is hereby corrected as shown below:

In the Claims

Col. 8, line 50, Claim 4, should read as follows:

iv) thereafter automatically sending the updated file from the data distribution system to the file server requesting the update if the data distribution system determines that the identifier associated <u>with</u> the updated file corresponds to the identifier associated with the subscription request; and Col. 10, line 17, Claim 16, should read as follows:

receiving, from the proxy server, a request for a file <u>and</u> a subscription request for future automatic updates to a file, the subscription request including an identifier;

Signed and Sealed this
Seventeenth Day of February, 2015

Michelle K. Lee
*Deputy Director of the United States Patent and Trademark Office*